United States Patent
Ferris (10) Patent No.: US 9,870,541 B2
(45) Date of Patent: Jan. 16, 2018

(54) SERVICE LEVEL BACKUP USING RE-CLOUD NETWORK

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 1378 days.

(21) Appl. No.: 12/324,803

(22) Filed: Nov. 26, 2008

(65) Prior Publication Data

US 2010/0131324 A1 May 27, 2010

(51) Int. Cl.
G06Q 10/06 (2012.01)

(52) U.S. Cl.
CPC ......... *G06Q 10/06* (2013.01); *G06Q 10/0631* (2013.01)

(58) Field of Classification Search
USPC .......................................................... 705/8
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 * | 5/2009 | Spertus et al. | |
| 7,546,462 B2 | 6/2009 | Upton | |
| 7,596,620 B1 | 9/2009 | Colton et al. | |
| 8,489,939 B2 * | 7/2013 | Hiltunen ............... | G06F 11/008 714/48 |
| 8,839,049 B2 * | 9/2014 | Hiltunen ............... | G06F 11/008 714/48 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0016692 A1 * | 1/2003 | Thomas ............... | H04J 14/0282 370/442 |
| 2003/0037258 A1 | 2/2003 | Koren | |
| 2003/0110252 A1 | 6/2003 | Yang-Huffman | |
| 2003/0135609 A1 * | 7/2003 | Carlson et al. ............... | 709/224 |
| 2004/0162902 A1 | 8/2004 | Davis | |

(Continued)

OTHER PUBLICATIONS

Kalmanek, Charles R.; Misra, Sudip; Yang, Y. Richard; "Guide to Reliable Internet Services and Applications" eBook; Series: Computer Communications and Networks; London; Springer; 2010. pp. 1-60.*

(Continued)

*Primary Examiner* — Leland Marcus
(74) *Attorney, Agent, or Firm* — Lowenstein Sandler LLP (57) ABSTRACT

Embodiments relate to systems and methods for service level backup using a re-cloud network. A set of operating clouds can support many users. The users can accept service based on a service level agreement (SLA), according to which the user is assured a certain level of service or support from the cloud, such as a minimum amount of uptime, a minimum amount of processor cycles or network bandwidth, or other guaranteed parameters of the usage of their virtual machine. The set of operating clouds in which the user's service is supported can be configured to communicate a service level augmentation request to a backup cloud to request additional resources to maintain the delivery of one or more SLA-specified support to users. The backup cloud network can in turn be nested with other backup clouds or resources.

18 Claims, 5 Drawing Sheets

(56) References Cited

U.S. PATENT DOCUMENTS

| | | | |
|---|---|---|---|
| 2004/0205206 A1* | 10/2004 | Naik | H04L 29/06 709/230 |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |
| 2007/0011291 A1 | 1/2007 | Mi et al. | |
| 2007/0028001 A1 | 2/2007 | Phillips et al. | |
| 2007/0226715 A1 | 9/2007 | Kimura et al. | |
| 2007/0283282 A1 | 12/2007 | Bonfiglio et al. | |
| 2007/0294676 A1 | 12/2007 | Mellor et al. | |
| 2008/0080396 A1 | 4/2008 | Meijer et al. | |
| 2008/0080718 A1 | 4/2008 | Meijer et al. | |
| 2008/0082538 A1 | 4/2008 | Meijer et al. | |
| 2008/0082601 A1 | 4/2008 | Meijer et al. | |
| 2008/0083025 A1 | 4/2008 | Meijer et al. | |
| 2008/0083040 A1 | 4/2008 | Dani et al. | |
| 2008/0086727 A1 | 4/2008 | Lam et al. | |
| 2008/0091613 A1 | 4/2008 | Gates et al. | |
| 2008/0104608 A1 | 5/2008 | Hyser et al. | |
| 2008/0215796 A1 | 9/2008 | Lam et al. | |
| 2008/0240150 A1 | 10/2008 | Dias et al. | |
| 2009/0012885 A1 | 1/2009 | Cahn | |
| 2009/0025006 A1 | 1/2009 | Waldspurger | |
| 2009/0037496 A1 | 2/2009 | Chong et al. | |
| 2009/0089078 A1 | 4/2009 | Bursey | |
| 2009/0099940 A1 | 4/2009 | Frederick et al. | |
| 2009/0132695 A1 | 5/2009 | Surtani et al. | |
| 2009/0177514 A1 | 7/2009 | Hudis et al. | |
| 2009/0210527 A1 | 8/2009 | Kawato | |
| 2009/0210875 A1 | 8/2009 | Bolles et al. | |
| 2009/0217267 A1 | 8/2009 | Gebhart et al. | |
| 2009/0222805 A1 | 9/2009 | Faus et al. | |
| 2009/0228950 A1 | 9/2009 | Reed et al. | |
| 2009/0248693 A1 | 10/2009 | Sagar et al. | |
| 2009/0249287 A1 | 10/2009 | Patrick | |
| 2009/0260007 A1 | 10/2009 | Beaty et al. | |
| 2009/0265707 A1 | 10/2009 | Goodman et al. | |
| 2009/0271324 A1 | 10/2009 | Jandhyala et al. | |
| 2009/0276771 A1 | 11/2009 | Nickolov et al. | |
| 2009/0287691 A1 | 11/2009 | Sundaresan et al. | |
| 2009/0293056 A1 | 11/2009 | Ferris | |
| 2009/0299905 A1 | 12/2009 | Mestha et al. | |
| 2009/0299920 A1 | 12/2009 | Ferris et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300152 A1 | 12/2009 | Ferris | |
| 2009/0300169 A1* | 12/2009 | Sagar | H04L 12/24 709/224 |
| 2009/0300210 A1 | 12/2009 | Ferris | |
| 2009/0300423 A1 | 12/2009 | Ferris | |
| 2009/0300607 A1 | 12/2009 | Ferris et al. | |
| 2009/0300608 A1 | 12/2009 | Ferris | |
| 2009/0300635 A1 | 12/2009 | Ferris | |
| 2009/0300641 A1 | 12/2009 | Friedman et al. | |
| 2009/0300719 A1 | 12/2009 | Ferris | |
| 2010/0042720 A1 | 2/2010 | Stienhans et al. | |
| 2010/0050172 A1 | 2/2010 | Ferris | |
| 2010/0057831 A1 | 3/2010 | Williamson | |
| 2010/0058347 A1 | 3/2010 | Smith et al. | |
| 2010/0131590 A1 | 5/2010 | Coleman et al. | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0169477 A1 | 7/2010 | Stienhans et al. | |
| 2010/0220622 A1 | 9/2010 | Wei | |
| 2010/0299366 A1 | 11/2010 | Stienhans et al. | |
| 2011/0016214 A1 | 1/2011 | Jackson | |
| 2011/0131335 A1 | 6/2011 | Spaltro et al. | |
| 2012/0102369 A1* | 4/2012 | Hiltunen | G06F 11/008 714/48 |
| 2013/0298135 A1* | 11/2013 | Hiltunen | G06F 11/008 718/104 |

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

Ferris, et al., "Systems and Methods for Cominatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

Ferris, "Methods and Systems for Providing a Market for User-Controlled Resources to be Provided to a Cloud Computing Environment", U.S. Appl. No. 12/390,617, filed Feb. 23, 2009.

(56) References Cited

OTHER PUBLICATIONS

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

Ferris, "Methods and Systems for Providing a Universal Marketplace for Resources for Delivery to a Cloud Computing Environment", U.S. Appl. No. 12/475,228, filed May 29, 2009.

DeHaan et al., "Systems and Methods for Power Management in Managed Network Having Hardware-Based and Virtual Reources", U.S. Appl. No. 12/475,448, filed May 29, 2009.

DeHaan et al., "Methods and Systems for Flexible Cloud Management with Power Management Support", U.S. Appl. No. 12/473,987, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan, "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris, "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environment", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al., "Methods and Systems for Verifying Software License Compliance in Cloud Computing Environments", U.S. Appl. No. 12/627,643, filed Nov. 30, 2009.

Ferris et al., "Systems and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/628,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

Ferris et al., "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris.et al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

DeHaan, "Methods and Systems for Abstracting Cloud Management", U.S. Appl. No. 12/474,113, filed May 28, 2009.

Morgan, "Systems and Methods for Detecting Resource Consumption Events Over Sliding intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migrat on or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for introspective Application Reporting to Facilitate Virtual Machine Movement Between Cloud Hosts", U.S. Appl. No. 13/118,009, filed May 27, 2011.

Morgan, "Systems and Methods for Self-Moving Operating System installation in Cloud-Based Network", U.S. Appl. No. 13/149,877, filed May 31, 2011.

\* cited by examiner

SERVICE LEVEL BACKUP USING RE-CLOUD NETWORK

FIELD

The present teachings relate to systems and methods for service level backup using re-cloud network, and more particularly to platforms and techniques for activating resources from a backup cloud when resource delivery from a frontline cloud network decreases below service level commitments.

BACKGROUND OF RELATED ART

Cloud-based computing has enjoyed significant deployment in corporate, commercial, and other application spaces. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications For example, a user may wish to set up and instantiate a virtual server from the cloud to create a storefront to market products or services on a temporary basis. The user can lease or subscribe to the set of resources needed to build and run the set of instantiated virtual machines on a comparatively short-term basis, such as hours or days, for their intended application. The advent of cloud-based computing architectures has opened new possibilities for the rapid and scalable deployment of virtual Web stores, media outlets, and other online sites or services.

In some deployments, the operator of the cloud network may choose to offer the cloud users the option of a service level agreement (SLA). Under a SLA, the operator of the cloud network can provide the user with a set of different levels of guaranteed service or resources, such as different amounts, grades or levels of bandwidth, processing power, resource up-time, or other resources or services. In implementations, the different levels of resource or service commitment can be associated with different subscription fees, or other terms or conditions that depend on the quantity or nature of delivered service or support.

In the context of a set of SLAs that are implemented in a cloud environment, issues in the configuration and deployment of the delivered services can arise. One significant issue is that the delivery of service under a SLA to a user can be compromised by a failure of hardware, software, or other resources used to support a given level of service. In the event of a service failure or downgrade, the operator of the cloud network may have difficulty in resolving the failure and may be forced, for example, to rebuild a new cloud or constituent set of virtual machines to resume service.

It may be desirable to provide methods and systems for service level backup using a re-cloud network, in which cloud-based service level agreements can be ensured or backed up with second-level cloud networks to create readily available failover resources.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for service level backup using a re-cloud network. More particularly, embodiments relate to platforms and techniques to monitor a set of operating cloud networks for compliance with a set of service level agreements with one or more users. Different users may subscribe to different types or levels of resources from within one or more operating clouds. The internal cloud management systems of those clouds can monitor the levels of processor, memory, and/or other resources being delivered to users on a continuous, periodic, event-triggered, and/or other basis and determine the occasions when additional resources are needed to initiate, support, or maintain levels of service under the provisions of the set of service level agreements. When the delivered levels of service decrease below any thresholds or other triggers represented in the set of service level agreements, a service level augmentation request can be transmitted to a backup cloud or clouds. The cloud management system(s) of the backup cloud or clouds can then identify and/or instantiate resources from within that cloud available to deliver to the requesting operating cloud(s) and/or hosted virtual machines, to restore guaranteed service levels. When the operating cloud or clouds is capable of maintaining the specified service levels, the delivery of supplemental resources from the backup cloud or clouds can be discontinued.

Embodiments described herein can, as noted, be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

Figure 1:
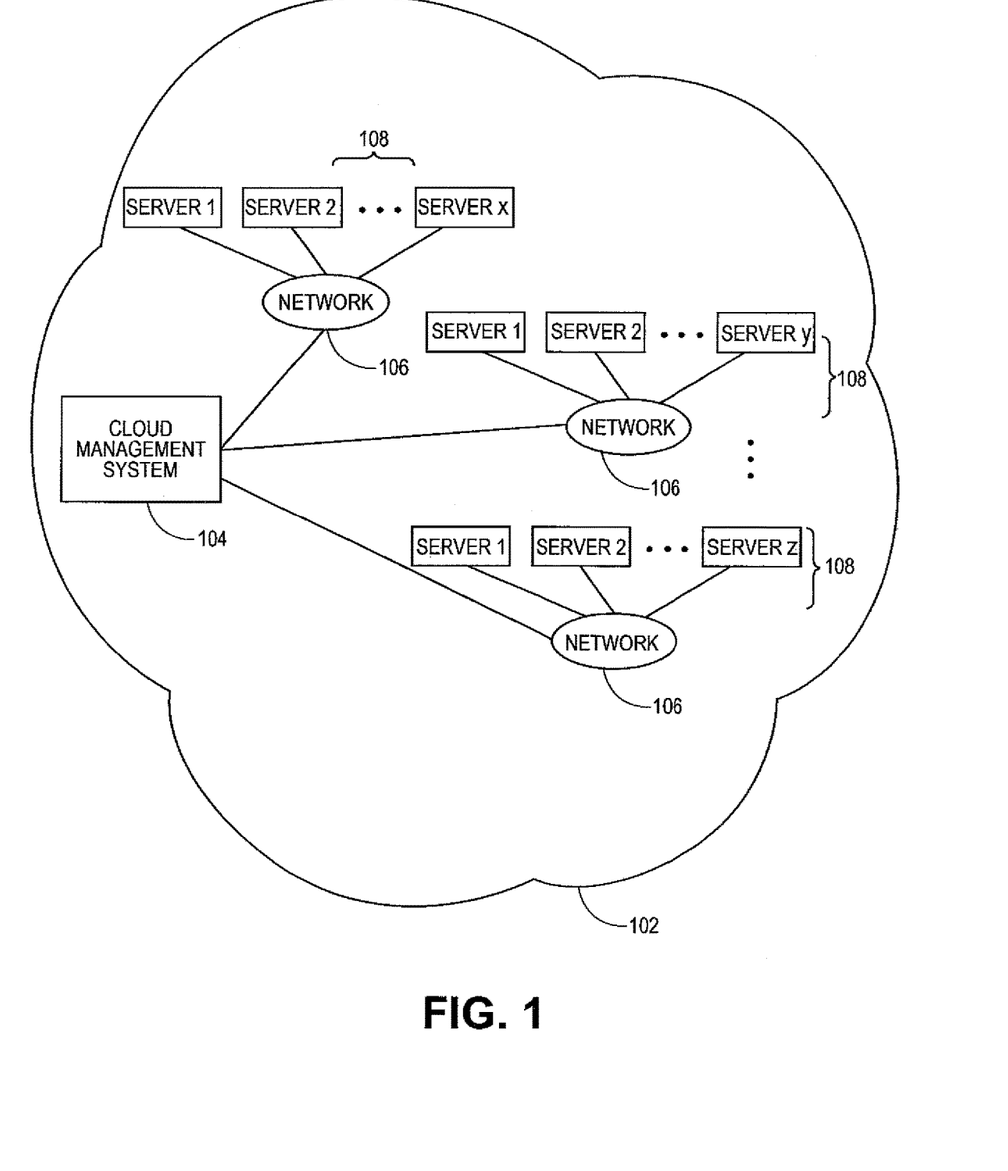
FIG. 1 illustrates an overall cloud system architecture in which various embodiments of the present teachings can be practiced.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
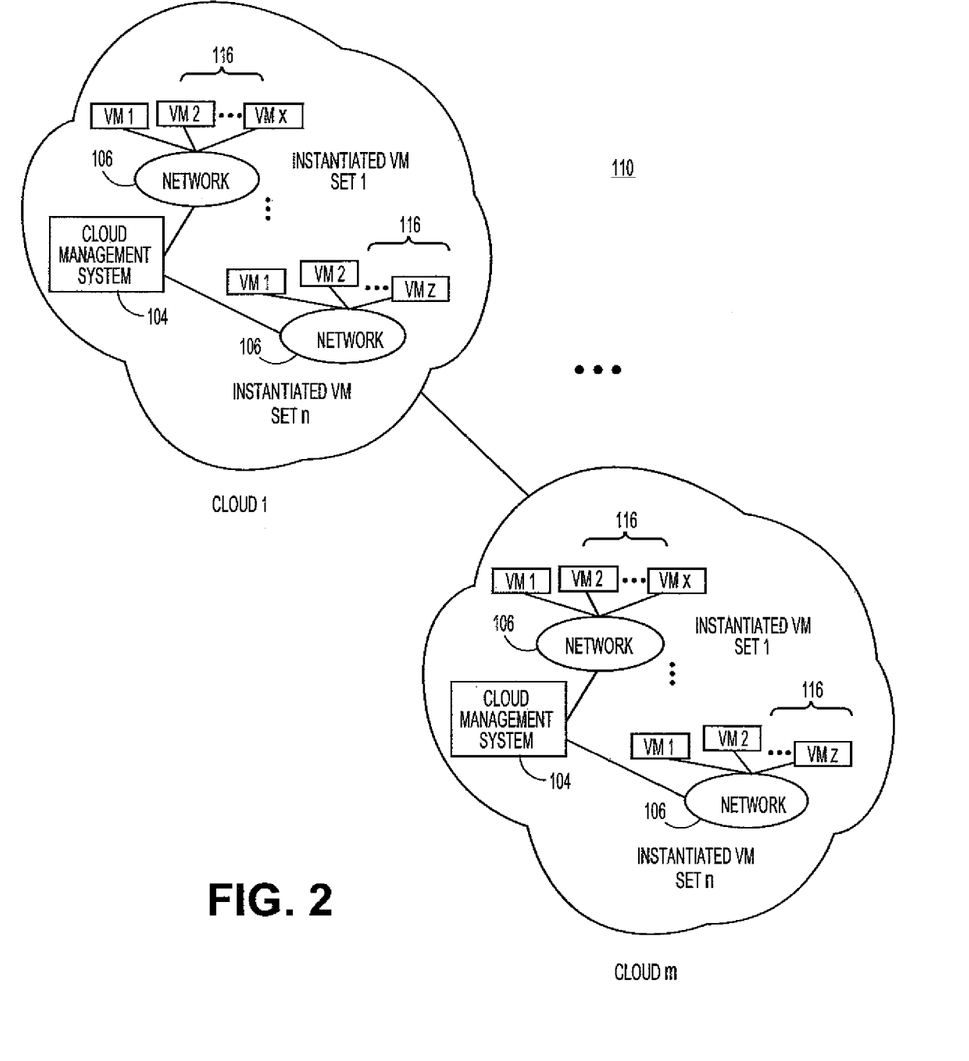
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 114 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud can 102, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated clients 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the main cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
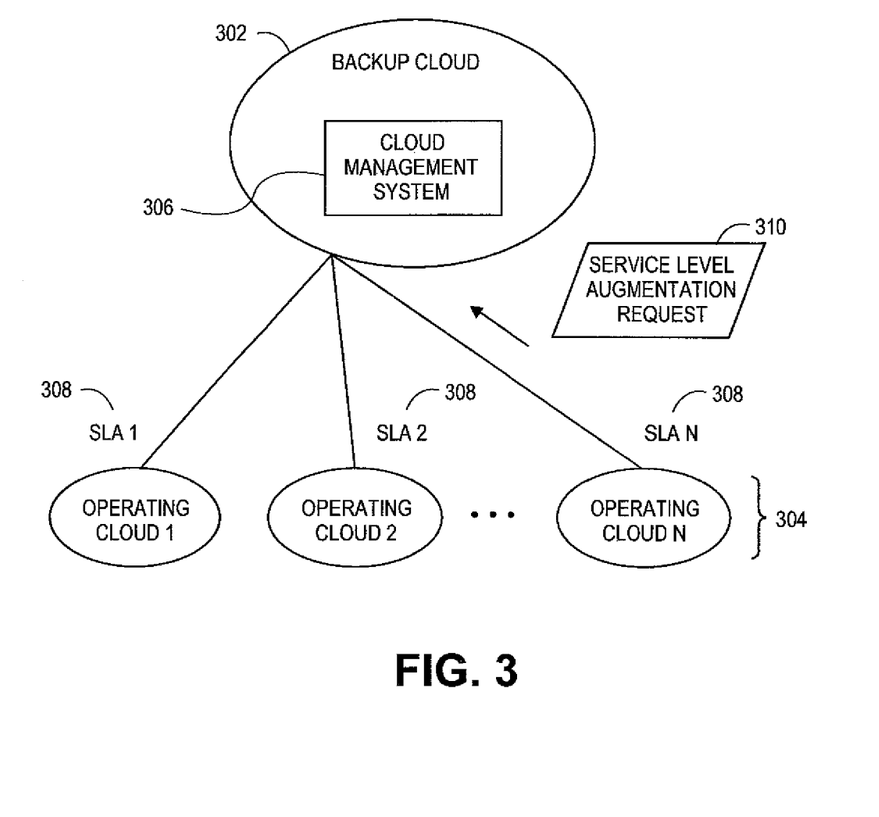
FIG. 3 illustrates an overall system for service level backup using a re-cloud network, according to various embodiments.

FIG. 3 illustrates an overall system 100 consistent with systems and methods for service level backup using a re-cloud network, according to various embodiments. In embodiments as shown, a set of operating clouds 304 can operate to instantiate and support a variety of virtual machines or other resources. The instantiated virtual machines can operate under a set of service level agreements (SLAs) 308. The set of service level agreements (SLAs) 308 can be entered into or registered with the operator or operators of set of operating clouds 304, or other entities. In embodiments, agreements or selections within set of service level agreements 308 can specify a dedicated amount of processor cycles, amounts of electronic memory, communications bandwidth, available minimum uptime, sets of applications or other software to be available, and/or other resources.

In embodiments according to various regards, a cloud management system or systems contained in set of operating clouds 308 can monitor the levels of service being delivered to users under set of service level agreements (SLAs) 308. When a shortfall under the specifications of one or more levels recorded in set of service level agreements (SLAs) 308 is detected, the cloud management system or other logic which detects that deficiency can generate a service level augmentation request 310. The service level augmentation request 310 can be transmitted to the cloud management system 306 of a backup cloud 302. The service level augmentation request 310 can contain an indication of one or more resources required to maintain service under set of service level agreements (SLAs) 308 for one or more users. In further embodiments, the levels of service being delivered can be monitored via the cloud management system 306 of backup cloud itself, or via other logic.

The cloud management system 306 can respond to service level augmentation request 310 by identifying and/or instantiating corresponding processor, memory, or other resources necessary to contribute to the requesting virtual machine, cloud, or clouds in set of operating clouds 304 to restore or maintain guaranteed service levels. The supplemental resources can be communicated to the requesting virtual machine, cloud, or clouds to augment the resources available to set of operating clouds 304 on an on-demand or as-needed basis. According to embodiments of the present teachings in one regard, the set of service level agreements (SLAS) 308 can in one regard therefore permit the guarantee of higher levels of service than might be possible in the absence of the resources afforded by backup cloud 302. According to various embodiments, it may be noted that a user or subscriber can optionally choose to request an upgrade over the service levels reflected in their service level agreement (SLA), according to changing demand. In embodiments, the operator of cloud management system 306 and/or other network providers could choose to satisfy an upgrade request, including to supply a number of virtual machines in excess of the total available within their associated set of operating clouds 304, by generating a re-cloud or multiple re-cloud request. Network providers can elect to deliver enhanced or upgraded service level agreements (SLAs), but may in instances charge a premium to the user's subscription cost to commit increased resources. Other service level agreement (SLA) options are possible.

Figure 4:
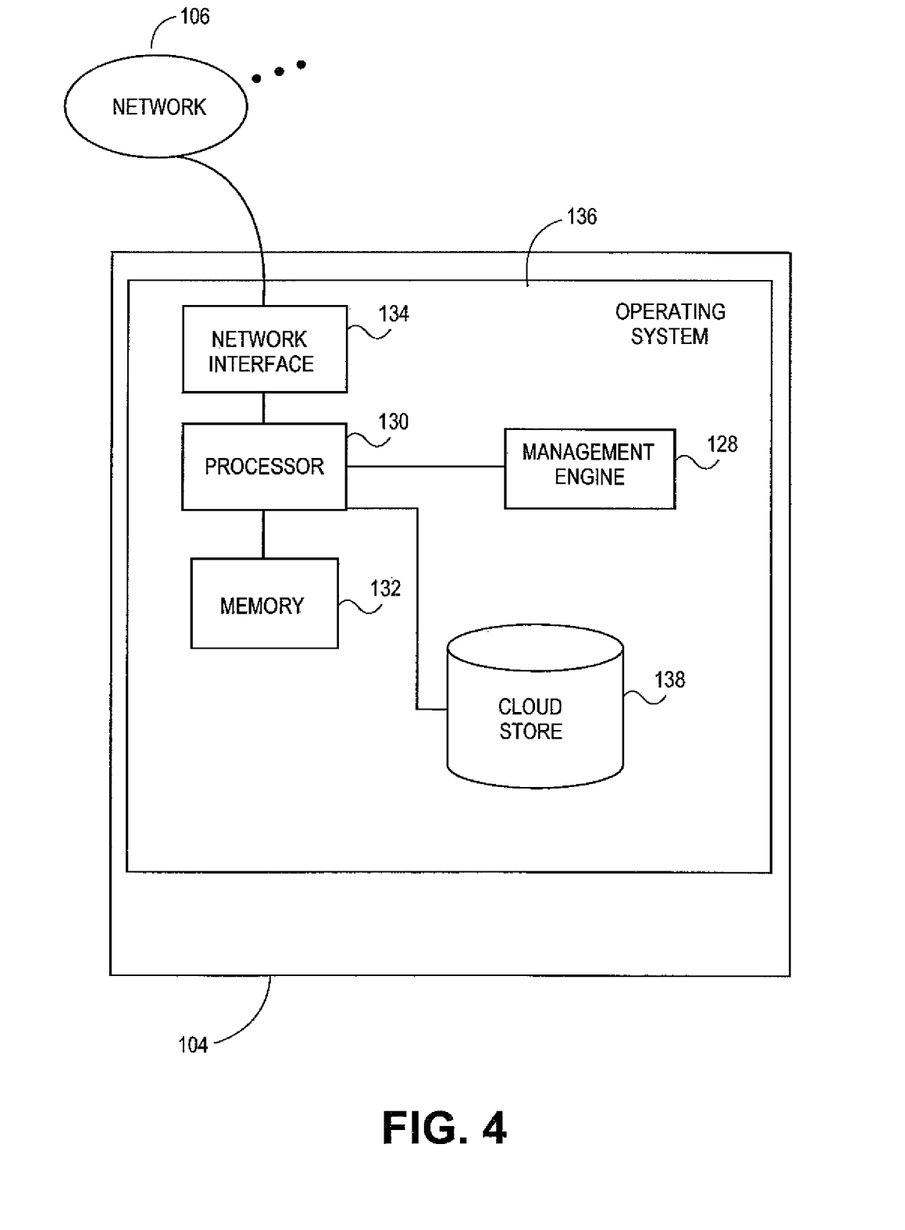
FIG. 4 illustrates an exemplary hardware configuration of a cloud management system, according to various embodiments.

FIG. 4 illustrates an exemplary diagram of hardware and other resources that can be incorporated in a cloud management system 104 configured to communicate with resources including, according to embodiments. In embodiments as shown, cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with cloud store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with management engine 128, to execute control logic and control the operation of virtual machines and other resources in cloud 102. Other configurations of cloud management system 104, associated network connections, and other hardware and software resources are possible.

Figure 5:
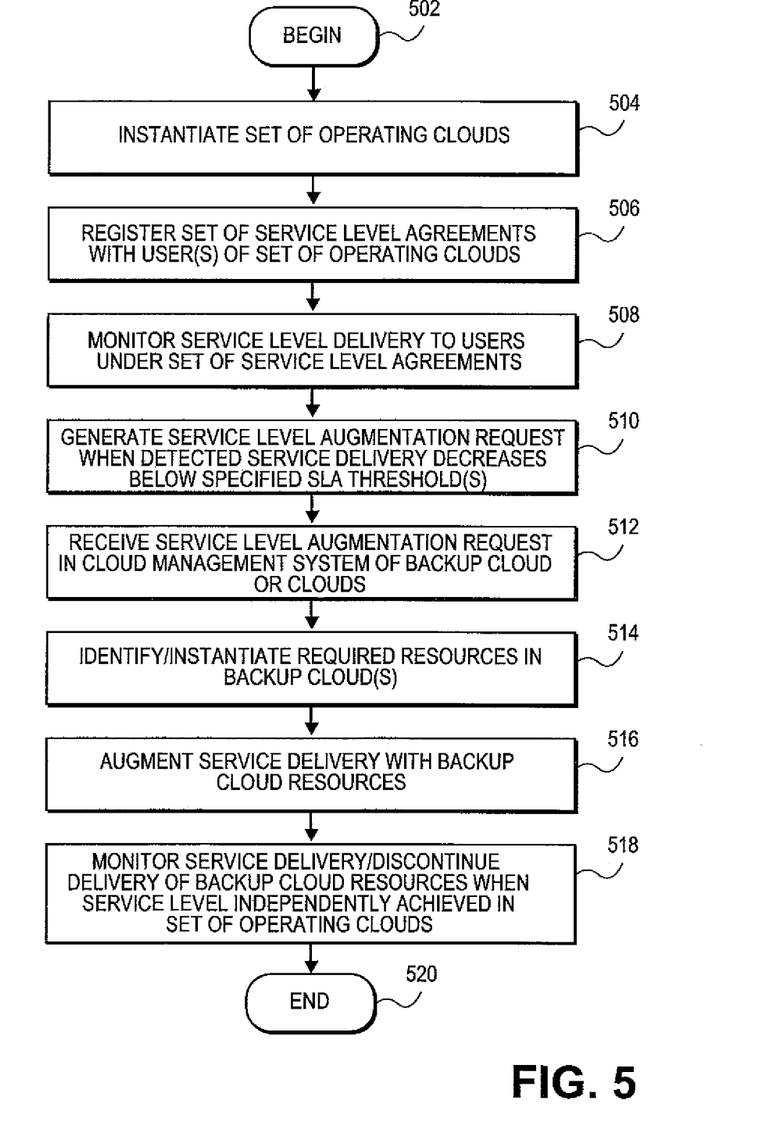
FIG. 5 illustrates a flowchart of overall service level backup processing using a re-cloud network, according to various embodiments.

FIG. 5 illustrates a flowchart of overall service level backup processing using a re-cloud network, according to various embodiments of the present teachings. In 502, processing can begin. In 504, a set of operating clouds 304 or portions thereof can be instantiated, for instance by a cloud network administrator or other user. In 506, a set of service level agreements (SLAs) 308 governing the allocation and delivery of various levels of services for users of set of operating clouds 304 can be registered, for example to one or more cloud management systems in one or more cloud networks of set of operating clouds 304. In embodiments, agreements and provisions in set of service level agreements (SLAs) 308 can determine or set, for example, the levels of processor power or cycles, minimum uptime, memory allocation, and/or other resources or services to be delivered at guaranteed levels to a user or users via set of operating clouds 304.

In 508, the service level delivery to one or more users of set of operating clouds 304 under governing service level agreements in set of service level agreements (SLAs) 308 can be monitored. The monitoring can be performed, for example, by cloud management system(s) located in set of operating clouds 304, or elsewhere. In 510, a service level augmentation request augmentation request 310 can be generated when the detected service delivery for one or more users decreases below any threshold specified in set of service lever agreements (SLAs) 308. For example, a cloud management system in set of operating clouds 304 can detect that an instantiated virtual machine has suffered a decrease in processor cycles or throughput below a guaranteed minimum level.

In 512, the service level augmentation request 310 can be received in the cloud management system 306 of backup cloud 302. In 514, the cloud management system 306 of backup cloud 302 can identify and/or instantiate the required resources in backup cloud 302 to satisfy the service level augmentation request 310. In 516, the services being delivered to the affected virtual machine(s) in set of operating clouds 304 can be augmented by resources from the backup cloud 302. In 518, the service level of the augmented virtual machine(s) can be monitored and when the delivery of service from set of operating clouds 308 independently achieves or can achieve minimum or greater levels under the set of service level agreements (SLAs) 308, augmented resources from backup cloud 302 can be discontinued, as appropriate. In 520, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which a set of operating clouds 304 are backed up by one backup cloud 302, in embodiments, more than one backup cloud can provide service level backup to one or more cloud in set of operating clouds 304. For further example, while embodiments have been described in which necessary supplemental resources are drawn from backup cloud 302, in embodiments resources needed to satisfy a service level augmentation request 310 can be drawn from other sources. For instance, resources can be drawn from other clouds in set of operating clouds 308. For yet further example, while embodiments have been described in which backup cloud 302 acts to provide one layer of backup resources, in embodiments, multiple backup clouds can be nested, chained, or otherwise combined to create multiple layers of backup resources. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:

executing, by a processor of a backup cloud management system computing device, one or more virtual machines for limited durations for users of backup cloud systems managed by the backup cloud management system computing device, wherein resources of the backup cloud systems are managed separately from other resources of an operating cloud, the resources comprising at least processing power of processors of computing devices and memory of storage devices of the computing devices used to execute the one or more virtual machines under direction of the backup cloud management system computing device;

managing, by the processor of the backup cloud management system computing device, the resources of the backup cloud systems to provide backup support for the operating cloud;

receiving, by the processor of the backup cloud management system computing device, an augmentation request from an operating cloud management system computing device of the operating cloud, wherein the augmentation request comprises an indication of resources to upgrade service above a service level reflected in a set of service level agreements (SLAs) for users of the operating cloud, and wherein the operating cloud does not comprise the resources to upgrade the service above the service level reflected in the set of SLAs;

identifying, by the processor of the backup cloud management system computing device, supplemental resources of the resources of the backup cloud systems to upgrade the service above the service level reflected in the set of SLAs as indicated in the augmentation request, wherein the identifying comprises selecting at least one of the supplemental resources in view of a match between a time period to complete the upgrade as specified by the augmentation request and a set of determined time periods for which each of the supplemental resources is offered to be available;

activating, by the processor of the backup cloud management system computing device, the identified supplemental resources of the backup cloud systems in view of the augmentation request, wherein each of the backup cloud systems activate successive levels of the resources in the operating cloud to upgrade the service above the service level reflected in the set of SLAs;

communicating, by the processor of the backup cloud management system computing device to the operating cloud management system computing device, with each of the backup cloud systems to determine an availability of the activated supplemental resources;

responsive to receiving confirmation of which operating clouds indicate the availability of the activated supplemental resources, identifying information of the activated supplemental resources that allows the operating cloud to access and utilize the activated supplemental resources, wherein the identifying comprises updating resource configurations of one or more instantiated virtual machines in view of configuration parameters defined in the augmentation request, wherein the one or more instantiated virtual machines are associated with at least one operating cloud that confirmed availability of the activated supplemental resources;

causing, by the processor of the backup cloud management system computing device, the operating cloud management system computing device to instruct the operating cloud to augment resources provided by the instantiated virtual machines of the at least one operating cloud to upgrade the service above the service level reflected in the set of SLAs;

monitoring a virtual machine executing in the operating cloud to determine when the operating cloud can upgrade the service above the service level reflected in the set of SLAs without the supplemental resources of the backup cloud systems; and in response to a determination that the operating cloud can upgrade the service above the service level reflected in the set of SLAs without the supplemental resources of the backup cloud systems, discontinuing an activation of the supplemental resources of the backup cloud systems.

2. The method of claim 1, wherein the service comprises a level of service designated in the set of SLAs.

3. The method of claim 1, wherein the augmentation request comprises a request for at least one of processing cycles, memory allocation, or input/output (I/O) throughput.

4. The method of claim 1, wherein the augmentation request is generated in view of a change in service level delivered to a user of the operating cloud.

5. The method of claim 1, wherein the augmentation request is generated in view of a manual selection of a user.

6. The method of claim 1, further comprising deactivating resources in the backup cloud in view of a change in level delivered to a user of the operating cloud.

7. A system comprising:

a memory; and a processor, communicably coupled to the memory, to:

execute one or more virtual machines for limited durations for users of backup cloud systems managed by a backup cloud management system computing device, wherein resources of the backup cloud systems are managed separately from other resources of an operating cloud, the resources comprising at least processing power of processors of computing devices and memory of storage devices of the computing devices used to execute the one or more virtual machines under direction of the backup cloud management system computing device;

manage the resources of the backup cloud systems to provide backup support for the operating cloud;

receive an augmentation request from an operating cloud management computing device of the operating cloud, wherein the service level augmentation request comprises an indication of resources to upgrade service above a service level reflected in a set of service level agreements (SLAs) for users of the operating cloud, and wherein the operating cloud does not comprise the resources to upgrade the service above a service level reflected in the set of SLAs;

identify supplemental resources of the resources of the backup cloud systems to upgrade the service above the service level reflected in the set of SLAs as indicated in the augmentation request, wherein to identify, the processor to selecting at least one of the supplemental resources in view of a match between a time period to complete the upgrade as specified by the augmentation request and a set of determined time periods for which each of the supplemental resources is offered to be available;

activate the identified supplemental resources of the backup cloud systems in view of the augmentation request, wherein each of the backup cloud systems activate successive levels of the resources in the operating cloud to upgrade the service above a service level reflected in the set of SLAs;

communicate, by the operating cloud management system computing device, with each of the backup cloud systems to determine an availability of the activated supplemental resources;

responsive to receiving confirmation of which operating clouds indicate the availability of the activated supplemental resources, identify information of the activated supplemental resources that allows the operating cloud to access and utilize the activated supplemental resources, wherein to identify comprises updating resource configurations of one or more instantiated virtual machines in view of configuration parameters defined in the augmentation request, wherein the one or more instantiated virtual machines are associated with at least one operating cloud that confirmed availability of the activated supplemental resources;

cause the operating cloud management system computing device to instruct the operating cloud to augment resources provided by the instantiated virtual machines of the at least one operating cloud to upgrade the service above a service level reflected in the set of SLAs;

monitor a virtual machine that executes in the operating cloud to determine when the operating cloud can upgrade the service above a service level reflected in the set of SLAs without the supplemental resources of the backup cloud systems; and in response to a determination that the operating cloud can upgrade the service above a service level reflected in the set of SLAs without the supplemental resources of the backup cloud systems, discontinue an activation of the supplemental resources of the backup cloud systems.

8. The system of claim 7, wherein the service comprises a level of service designated in the set of SLAs.

9. The system of claim 7, wherein the augmentation request comprises a request for at least one of processing cycles, memory allocation, or input/output (I/O) throughput.

10. The system of claim 7, wherein the augmentation request is generated in view of a change in service level delivered to a user of the operating cloud.

11. The system of claim 7, wherein the augmentation request is generated in view of a manual selection of a user.

12. The system of claim 7, further comprising deactivating resources in the backup cloud in view of a change in level delivered to a user of the operating cloud.

13. A non-transitory machine-readable storage medium including instructions that, when executed by a processor, cause the processor to:

execute, by the processor of a backup cloud management system computing device, one or more virtual machines for limited durations for users of backup cloud systems managed by the backup cloud management system computing device, wherein resources of the backup cloud systems are managed separately from other resources of an operating cloud, the resources comprising at least processing power of processors of computing devices and memory of storage devices of the computing devices used to execute the one or more virtual machines under direction of the backup cloud management system computing device;

manage, by the processor of the backup cloud management system computing device, the resources of the backup cloud systems to provide backup support for the operating cloud;

receive, by the processor of the backup cloud management system computing device, an augmentation request from an operating cloud management system computing device of the operating cloud, wherein the augmentation request comprises an indication of resources to upgrade service above a service level reflected in a set of service level agreements (SLAs) for users of the operating cloud, and wherein the operating cloud does not comprise the resources to upgrade the service above a service level reflected in the set of SLAs;

identify, by the processor of the backup cloud management system computing device, supplemental resources of the resources of the backup cloud systems to upgrade the service above the service level reflected in the set of SLAs as indicated in the augmentation request, wherein to identify, the processor to selecting at least one of the supplemental resources in view of a match between a time period to complete the upgrade as specified by the augmentation request and a set of determined time periods for which each of the supplemental resources is offered to be available;

activate, by the processor of the backup cloud management system computing device, the identified supplemental resources of the backup cloud systems in view of the augmentation request, wherein each of the backup cloud systems activate successive levels of the resources in the operating cloud to upgrade the service above a service level reflected in the set of SLAs;

communicate, by the processor of the backup cloud management system computing device to the operating cloud management system computing device, with each of the backup cloud systems to determine an availability of the activated supplemental resources;

responsive to receiving confirmation of which operating clouds indicate the availability of the activated supplemental resources, identify information of the activated supplemental resources that allows the operating cloud to access and utilize the activated supplemental resources, wherein to identify comprises updating resource configurations of one or more instantiated virtual machines in view of configuration parameters defined in the augmentation request, wherein the one or more instantiated virtual machines are associated with at least one operating cloud that confirmed availability of the activated supplemental resources;

cause, by the processor of the backup cloud management system computing device, the operating cloud management system computing device to instruct the operating cloud to augment resources provided by the instantiated virtual machines of the at least one operating cloud with the activated supplemental resources of the backup cloud systems in order to upgrade the service above a service level reflected in the set of SLAs;

monitor a virtual machine that executes in the operating cloud to determine when the operating cloud can upgrade the service above a service level reflected in the set of SLAs without the supplemental resources of the backup cloud systems; and in response to a determination that the operating cloud can upgrade the service above a service level reflected in the set of SLAs without the supplemental resources of the backup cloud systems, discontinue an activation of the supplemental resources of the backup cloud systems.

14. The non-transitory machine-readable storage medium set of claim 13, wherein the service comprises a level of service designated in the set of SLAs.

15. The non-transitory machine-readable storage medium set of claim 13, wherein the augmentation request comprises a request for at least one of processing cycles, memory allocation, or input/output (I/O) throughput.

16. The non-transitory machine-readable storage medium set of claim 13, wherein the augmentation request is generated in view of a change in service level delivered to a user of the operating cloud.

17. The non-transitory machine-readable storage medium set of claim 13, wherein the augmentation request is generated in view of a manual selection of a user.

18. The non-transitory machine-readable storage medium set of claim 13, further comprising the processor to deactivate resources in the backup cloud in view of a change in level delivered to a user of the operating cloud.

* * * * *